(12) United States Patent
Kore et al.

(10) Patent No.: US 7,289,466 B2
(45) Date of Patent: Oct. 30, 2007

(54) LOCALIZATION FOR LOW COST SENSOR NETWORK

(75) Inventors: Vinayak S. Kore, Bangalor (IN); Arun V. Mahasenan, Kerala (IN); Patrick S. Gonia, Maplewood, MN (US)

(73) Assignee: Honeywell International Inc., Morristown, NJ (US)

( * ) Notice: Subject to any disclaimer, the term of this patent is extended or adjusted under 35 U.S.C. 154(b) by 48 days.

(21) Appl. No.: 11/163,099

(22) Filed: Oct. 5, 2005

(65) Prior Publication Data

US 2007/0076638 A1    Apr. 5, 2007

(51) Int. Cl.
*H04Q 7/00*    (2006.01)

(52) U.S. Cl. ............... 370/328; 370/338; 370/339; 370/401; 455/456.1; 455/456.2; 455/456.3

(58) Field of Classification Search .......... 370/331, 370/332, 349, 338, 339, 328, 401; 455/456.1, 455/456.2, 456.3
See application file for complete search history.

(56) References Cited

U.S. PATENT DOCUMENTS

| | | | |
|---|---|---|---|
| 3,643,183 A | 2/1972 | Geffe | |
| 3,715,693 A | 2/1973 | Fletcher et al. | |
| 3,758,885 A | 9/1973 | Voorman et al. | |
| 4,264,874 A | 4/1981 | Young | |
| 4,529,947 A | 7/1985 | Biard et al. | |
| 4,614,945 A | 9/1986 | Brunius et al. | |
| 4,812,785 A | 3/1989 | Pauker | |
| 4,817,000 A * | 3/1989 | Eberhardt | 701/200 |
| 4,843,638 A | 6/1989 | Walters | |
| 5,392,003 A | 2/1995 | Nag et al. | |
| 5,428,602 A | 6/1995 | Kemppainen | |

(Continued)

FOREIGN PATENT DOCUMENTS

CH         673184         2/1990

(Continued)

OTHER PUBLICATIONS

"Medium Access Control (MAC) and Physical (PHY) Specifications," ANSI/IEEE Std 802.11, pp. 177-179, 1999.

(Continued)

*Primary Examiner*—Matthew Anderson
*Assistant Examiner*—Tuan Pham
(74) *Attorney, Agent, or Firm*—Kris T. Fredrick

(57) ABSTRACT

Wireless devices, systems and approaches or methods having the capability of determining the location of a given wireless device. An example system includes a wireless device that generates at least one pulse as a part of an output signal, and the at least one pulse is captured by anchor devices and used, in a time of arrival approach, to determine the location of the example device. The at least one pulse may be generated during a designated portion of an otherwise normally modulated message. Another example system includes an anchor node that generates a directional output signal, the direction output signal including data indicating its direction, and the directions of output signals from plural anchor nodes when pointed at a wireless device are used to determine the location of the wireless device. Combinations of the pulse and directional antenna systems, devices used within each of these systems, and approaches associated with these systems are also included.

23 Claims, 10 Drawing Sheets

U.S. PATENT DOCUMENTS

| | | | |
|---|---|---|---|
| 5,428,637 A | 6/1995 | Oliva, Jr. et al. | |
| 5,430,409 A | 7/1995 | Buck et al. | |
| 5,438,329 A | 8/1995 | Gastouniotis et al. | |
| 5,451,898 A | 9/1995 | Johnson | |
| 5,481,259 A | 1/1996 | Bane | |
| 5,642,071 A | 6/1997 | Sevenhans et al. | |
| 5,659,303 A | 8/1997 | Adair, Jr. | |
| 5,726,603 A | 3/1998 | Chawla et al. | |
| 5,767,664 A | 6/1998 | Price | |
| 5,809,013 A | 9/1998 | Kackman | |
| 5,847,623 A | 12/1998 | Hadjichristos | |
| 5,945,948 A * | 8/1999 | Buford et al. | 342/457 |
| 5,963,650 A | 10/1999 | Simionescu et al. | |
| 6,006,113 A * | 12/1999 | Meredith | 455/561 |
| 6,052,600 A | 4/2000 | Fette et al. | |
| 6,058,137 A | 5/2000 | Partyka | |
| 6,091,715 A | 7/2000 | Vucetic et al. | |
| 6,175,860 B1 | 1/2001 | Gaucher | |
| 6,266,534 B1 | 7/2001 | Raith et al. | |
| 6,353,846 B1 | 3/2002 | Fleeson | |
| 6,366,622 B1 | 4/2002 | Brown et al. | |
| 6,414,963 B1 | 7/2002 | Gemar | |
| 6,624,750 B1 | 9/2003 | Marman et al. | |
| 6,768,901 B1 | 7/2004 | Osborn et al. | |
| 6,785,255 B2 | 8/2004 | Sastri et al. | |
| 6,799,099 B2 * | 9/2004 | Zeitler et al. | 701/23 |
| 6,823,181 B1 | 11/2004 | Kohno et al. | |
| 6,836,506 B2 | 12/2004 | Anderson | |
| 6,901,066 B1 | 5/2005 | Helgeson | |
| 7,019,693 B2 * | 3/2006 | Spirito | 342/462 |
| 7,149,499 B1 * | 12/2006 | Oran et al. | 455/404.2 |
| 2002/0011923 A1 | 1/2002 | Cunningham et al. | |
| 2002/0085622 A1 | 7/2002 | Dhar et al. | |
| 2002/0141479 A1 | 10/2002 | Gracia-Luna-Aceves et al. | |
| 2003/0053555 A1 | 3/2003 | McCorkle et al. | |
| 2003/0198280 A1 | 10/2003 | Wang et al. | |
| 2004/0253996 A1 | 12/2004 | Chen et al. | |
| 2005/0233748 A1 * | 10/2005 | Robinson et al. | 455/440 |
| 2005/0281215 A1 | 12/2005 | Budampati et al. | |
| 2005/0288888 A1 * | 12/2005 | Ye et al. | 702/150 |
| 2006/0039300 A1 * | 2/2006 | Ogier et al. | 370/254 |
| 2007/0041352 A1 * | 2/2007 | Frankel et al. | 370/338 |

FOREIGN PATENT DOCUMENTS

| | | |
|---|---|---|
| DE | 4344172 | 6/1995 |
| DE | 10200676 | 7/2003 |
| EP | 0607562 | 7/1994 |
| EP | 0893931 | 1/1999 |
| WO | 9934230 | 7/1999 |
| WO | WO 00/70572 | 11/2000 |

OTHER PUBLICATIONS

"Product Specification for Advanced Pager Receiver UAA2082", Philips, Integrated Circuits, 41 pages, Jan. 15, 1996.
"ZigBee Wireless Networking Software," EmberNet ZigBee, 2 pages, prior to Jun. 17, 2005.
Abidi, "Direct-Conversion Radio Transceivers for Digital Communications," IEEE Journal of Solid-State Circuits, vol. 30, No. 12, pp. 1399-1410, Dec. 1995.
Abidi, "Upconversion and Downcoversion Mixers for CMOS Wireless Transceivers," copyright AAA, 42 pages, 1996.
Chang et al., "A CMOS Channel-Select Filter for a Direct-Conversion Wireless Receiver," IEEE Journal of Solid-State Circuits, vol. 32, No. 5, pp. 722-729, May 1997.
Cheng et al., "TPS: A Time-Based Positioning Scheme for Outdoor Wireless Sensor Networks," IEEE INFOCOM 2004, 12 pages, 2004.
Craig, "Zigbee: Wireless Control That Simply Works," 7 pages, prior to Jun. 17, 2005.
Crols et al., "CMOS Wireless Transceiver Design," Kluwer Academic Publishers, 22 pages, 1997.
http://wiki.personaltelco.net/index.cgi/PhasedArray?action=print, "Phased Array—Personal Telco Wiki," 3 pages, May 2, 2005.
http://www.bamboweb.com/articles/o/s/OSI_model.html, "Bambooweb OSI model," Bambooweb Dictionary, 5 pages, printed May 23, 2005.
http://www.dailywireless.org/modules.php?name=News &file=article&sid=871, "Location By Triangulation—Not," Daily Wireless, 2 pages, pritned May 2, 2005.
http://www.unstrung.com/document.asp?site=unstrung &doc_id15069&page_number=1, 11 pages, printed May 2, 2005.
http://www.zigbee.org/en/about/faq.asp, "Wireless Control That Simply Works," ZigBee Alliance, 8 pages, printed Feb. 2, 2005.
Jung et al., "Improving IEEE 802.11 Power Saving Mechanism," 6 pages, Jul. 7, 2004.
Kinney, "ZigBee Technology: Wireless Control That Simply Works," 20 pages, Oct. 2, 2003.
Lee, "The Design of CMOS Radio-Frequency Integrated Circuits," Cambridge University Press, 42 pages, 1998.
Milstein, "Wideband Code Division Multiple Access," IEEE Journal on Selected Areas in Communications, vol. 18, No. 8, pp. 1344-1354, Aug. 2000.
Moulding et al., "Gyrator Video Filter IC with Automatic Tuning," IEEE Journal of Solid-State Circuits, vol. SC15, No. 6, Dec. 1980, pp. 963-968.
Nasipuri et al., "A Directionality Based Location Discovery Scheme for Wireless Sensor Networks," pp. 105-111, prior to Jun. 17, 2005.
Razavi, "Design Considerations for Direct-Conversion Receivers," IEEE Transactions on Circuits and Systems—II: Analog and Digital Signal Processing, vol. 44, No. 6, pp. 428-435, Jun. 1997.
Rofougaran et al., "A 1 GHz CMOS RF Front-End IC for a Direct-Conversion Wireless Receiver," IEEE Journal of Solid-State Circuits, vol. 31, pp. 880-889, Jul. 1996.
Rofougaran et al., "A 900 MHz CMOS RF Powr Amplifier with Programmable Output Power," Proceedings VLSI Circuits Symposium, Honolulu, 4 pages, Jun. 1994.
Savvides et al., "Dynamic Fine-Grained Localization in Ad-Hoc Networks of Sensors," pp. 166-179, prior to Jun. 17, 2005.
Want et al. "The Active Badge Location System," 7 pages, prior to Jun. 17, 2005.
Wilson et al., "A Single-Chip VHF and UHF Receiver for Radio Paging", IEEE Journal of Solid State Circuits, vol. 26, No. 12, 9 pp. 1944-1950, Dec. 1991.

* cited by examiner $\cot(a_1) = m/n$    $\cot(a_3) = (y-m)/n = y/n - m/n$ $\cot(a_1) + \cot(a_3) = m/n + y/n - m/n = y/n$ $n = y/[\cot(a_1) + \cot(a_3)]$ $m = n/\tan(a_1)$

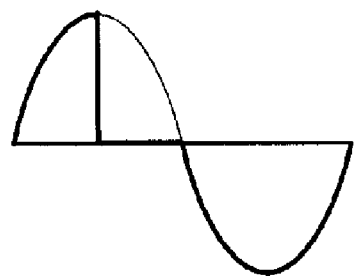
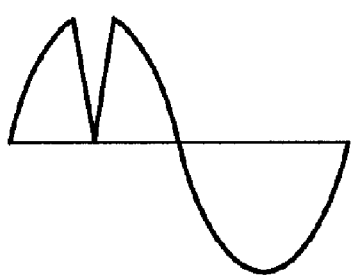
*FIG. 6A*  *FIG. 6B*
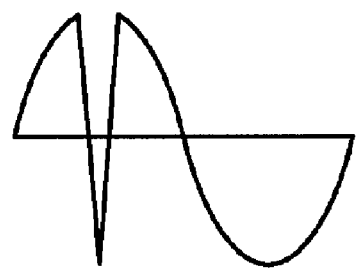
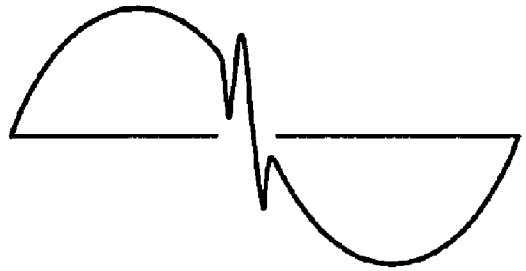
*FIG. 6C*  *FIG. 6D*
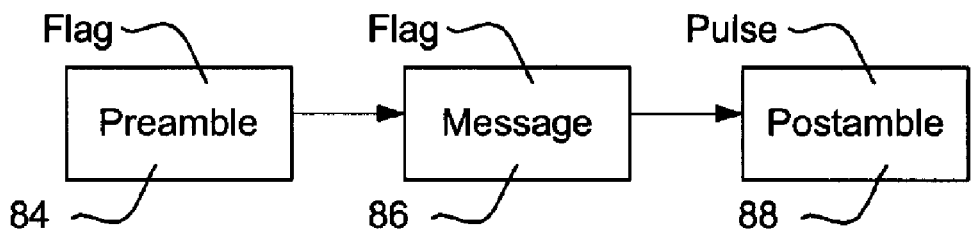
*FIG. 7*

LOCALIZATION FOR LOW COST SENSOR NETWORK

BACKGROUND

The present application is related to copending and commonly assigned U.S. patent application Ser. No. 11/163,105, entitled LOCALIZATION IDENTIFICATION SYSTEM FOR WIRELESS DEVICES, filed on Oct. 5, 2005.

The present invention is related to the field of wireless networks. More specifically, the present invention relates to efforts to determine the location of devices within a wireless network.

Wireless networks may be used in a number of contexts. One type of wireless network includes at least one base node and a number of distributed nodes. The distributed nodes may be used, for example, to capture and send data to the base node(s). In some such systems, the distributed nodes relay sensor information captured at the distributed nodes, if the distributed nodes are themselves sensors, or sensor information gathered from sensor nodes in communication with the distributed nodes. Approaches for localizing individual nodes in a wireless network are desired, for example, such that the origin of data collected at individual nodes may be identified, and/or such that internodal communications can be mapped in an efficient manner.

SUMMARY

An illustrative example system includes a wireless device that generates a pulse as a part of an output signal. In the illustrative example, the pulse is captured by anchor devices having known locations and used, in a time of arrival approach, to determine the location of the example device. Another illustrative example system includes an anchor node that generates a directional output signal, the direction output signal including data indicating its direction, and the directions of output signals from plural anchor nodes when pointed at a wireless device are used to determine the location of the wireless device. Combinations of the pulse and directional antenna systems, devices used within each of these systems, and approaches or methods associated with these systems are also included.

BRIEF DESCRIPTION OF THE DRAWING

FIGS. 6A-6D are graphic representations of a node-generated signals used in some illustrative examples;

FIG. 7 is a block diagram for a communication in an illustrative example;

DESCRIPTION

Figure 1:
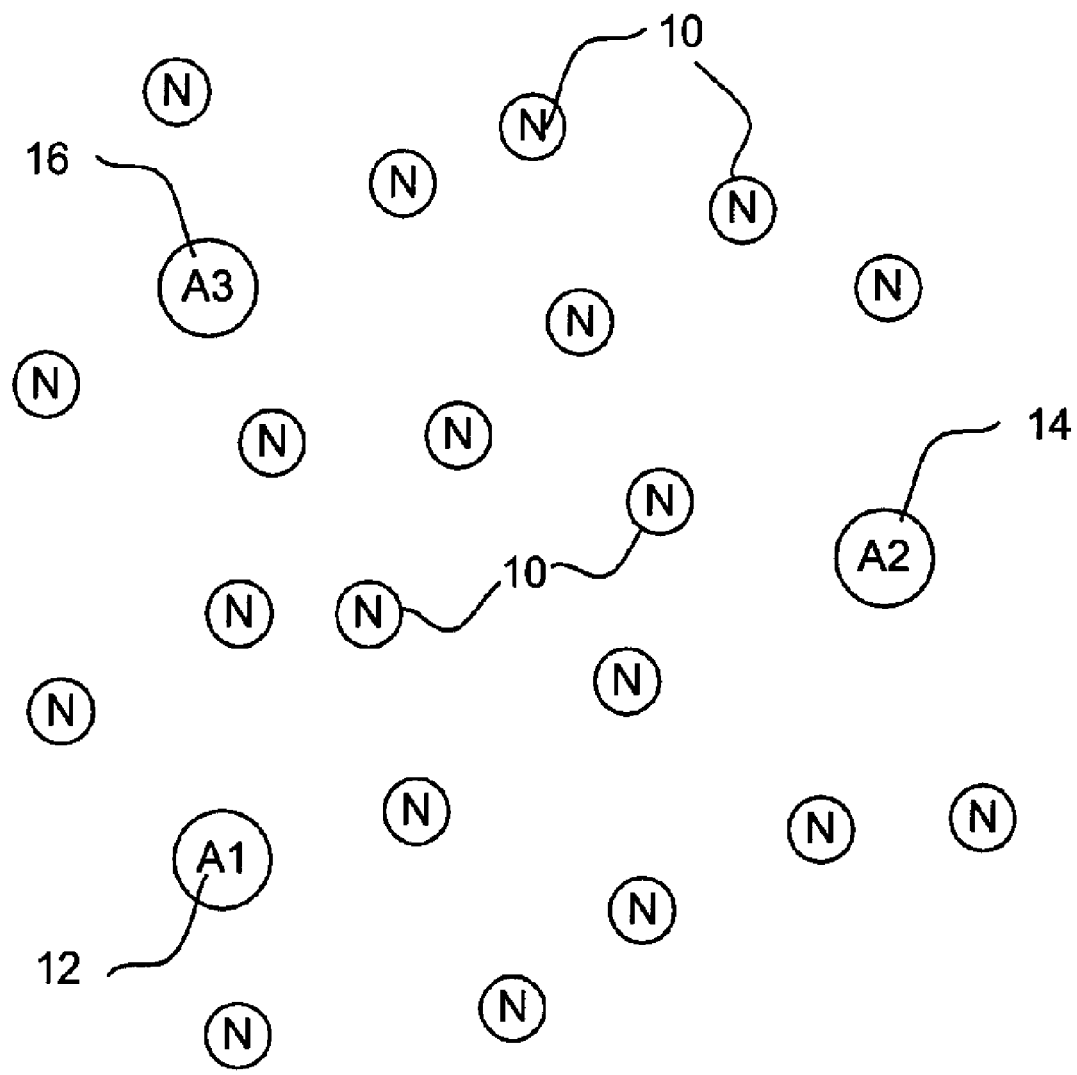
FIG. 1 is a diagram of a wireless system.

FIG. 1 is a diagram of a wireless system. The system includes a number of distributed nodes 10 and a number of anchor nodes 12, 14, 16. The anchor nodes 12, 14, 16 provide points of reference for indicating where the distributed nodes 10 are located. For instance, in some examples the anchor nodes 12, 14, 16 may include GPS components for determining global position. In other examples, the "global" location is less relevant than relative position, for instance, among the distributed nodes 10 and anchor nodes 12, 14, 16. It should be noted that only a portion of an illustrative system is shown; an example system may be of any size and may include any number of devices.

In an illustrative example, the system may define one or more coordinate systems based upon the locations of the anchor nodes 12, 14, 16. For instance, the position of anchor node A1 12 may be chosen as a point of origin for a coordinate system used to define the system, with the location of other devices in the system defined with respect to this coordinate system. Such a coordinate system may be chosen arbitrarily for the purposes of providing a reference coordinate system for defining locations.

In some illustrative examples, some or all of the distributed nodes 10 may be leaf nodes and some or all of the anchor nodes 12, 14, 16 may be infrastructure nodes as defined in copending U.S. patent application Ser. No. 10/870,295, entitled WIRELESS COMMUNICATION SYSTEM WITH CHANNEL HOPPING AND REDUNDANT CONNECTIVITY, the disclosure of which is incorporated herein by reference. The distributed nodes 10 are, in some examples, energy constrained devices operating with limited capacity power supplies, such as batteries. In some instances, some or all of the distributed nodes 10 may be reduced function devices, and some or all of the anchor nodes 12, 14, 16 may be full function devices, in accordance with how those terms are used by those skilled in the art. Some or all of the nodes in the system may also operate according to other communication protocols such as Bluetooth®, Zigbee® or various IEEE® 802.11 protocols, for example, as well as being adapted to operating using a number of such protocols.

Figure 2:
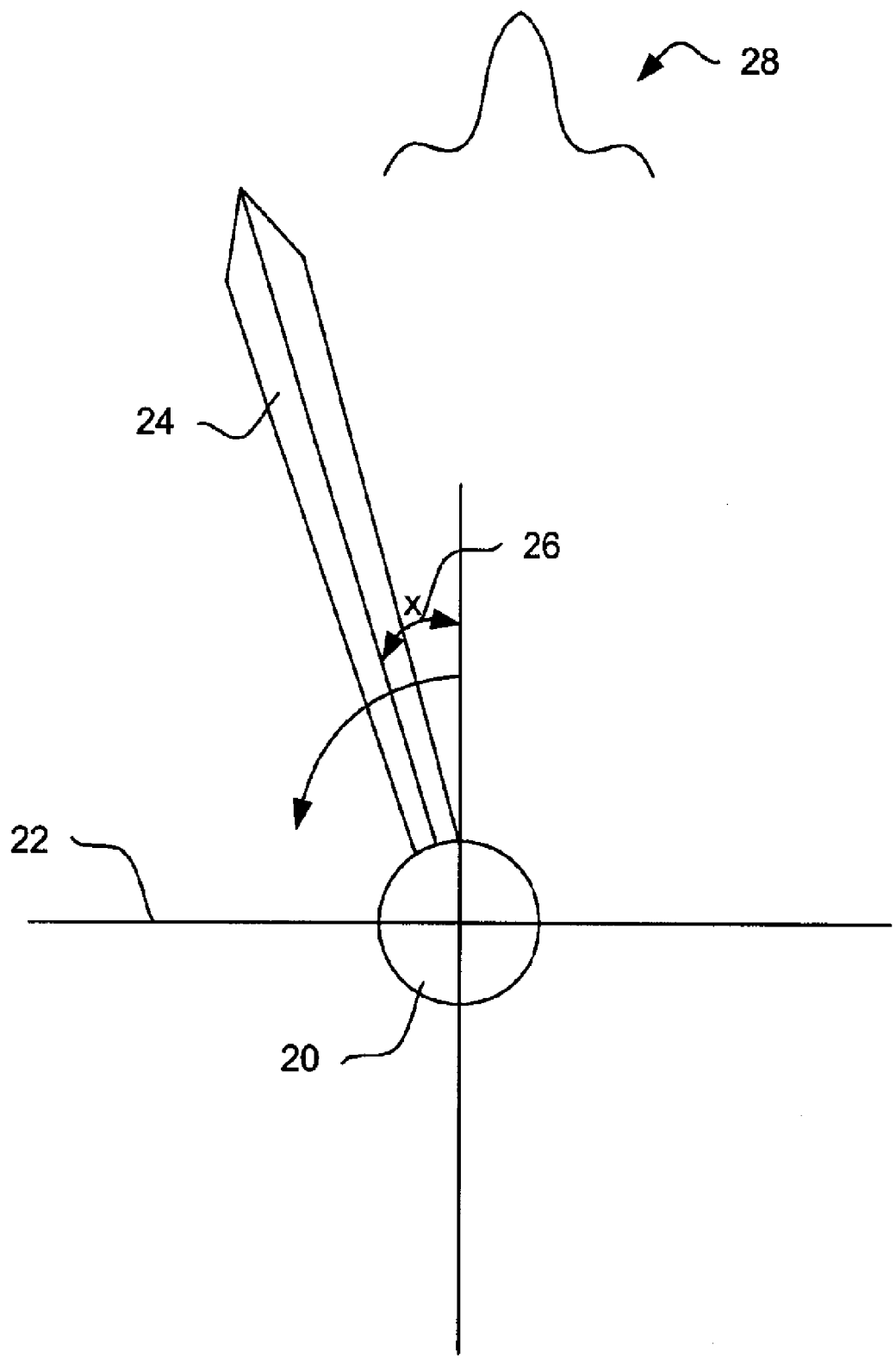
FIG. 2 illustrates an anchor node capable of producing a directed wireless output signal.

FIG. 2 illustrates an anchor node capable of producing a directed wireless output signal or beacon. The illustrative anchor node 20 is shown relative to an arbitrary coordinate system 22. The illustrative anchor node 20 is adapted to produce a beacon, shown at 24, having directional characteristics. In an illustrative example, the beacon 24 can be moved or rotated by the illustrative anchor node 20 with respect to the coordinate system 22. In some examples, the movement may be effected by a mechanical device. In other examples, a phased array antenna is used to cause movement of the beacon 24 without corresponding mechanical motion.

In an illustrative example, the beacon 24 includes data packets that indicate the angle x, shown at 26, of the beacon 24 with respect to the coordinate system 22 at the time each data packet is produced. The beacon data packets may also include location information for the anchor node 20 generating the beacon 24. Thus, for instance, at a first time a first data packet can be generated and sent as part of the beacon 24, with the first data packet indicating an angle x between the beacon 24 and a reference line at the time the first packet is sent, as well as data for the location of the anchor node 20 that produces the beacon 24. At another time, a second data packet can be generated and sent as part of the beacon 24. The second data packet may indicate another angle, not equal to x, between the beacon 24 and the reference line at the time the second packet is sent, as well as location information for the anchor node 20.

As shown at 28, the beacon 24 may have an intensity profile that varies with position. For most directional antennae, there will be a center lobe or peak in the beacon where signal strength will be greatest, and side peaks (not shown) may also appear. The signal strength profile 28 may be used to determine when the directional antenna is directed at a target, by observing when the peak intensity occurs.

Figure 3:
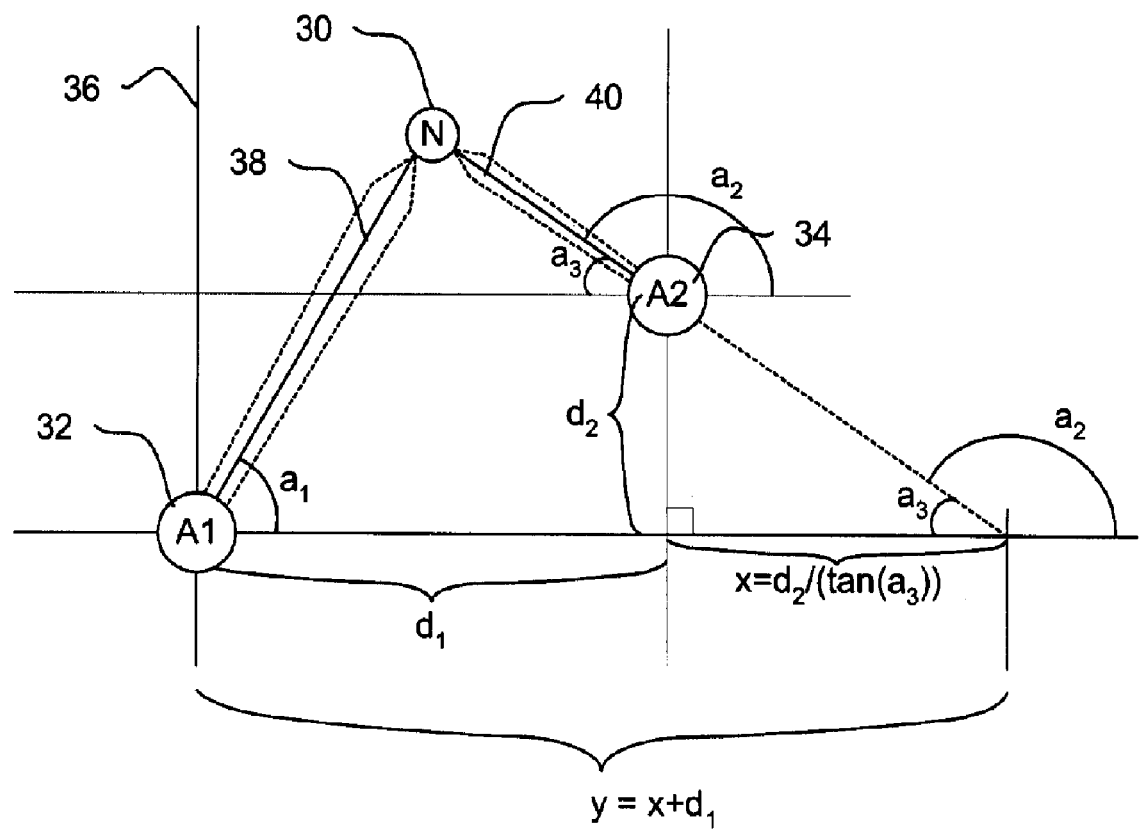
FIG. 3 is a geometric representation of an illustrative example.

FIG. 3 is a geometric representation of an illustrative example. The location of node 30 can be determined using a first anchor node 32 and a second anchor node 34. A coordinate system 36 is shown for illustrative purposes with first anchor node 32 located at (0,0), and second anchor node 34 located at (d1, d2). Two distances d1 and d2 define the relative locations of the first anchor node 32 and the second anchor node 34. Using a directed signal as shown in FIG. 2, the angle of transmission when node 30 is within the main lobe of each beacon can be found, since the angle and location of transmission is included in data packets that form part of the beacons 38, 40 from the anchor nodes 32, 34. As such, angles a1 and a2 can be defined, both with reference to the arbitrary coordinate system 36. Angle a3 is also defined, a3 being the supplement of a2. Extending a line from the node 30 beyond the second anchor node 34, as shown, allows a distance, y, to be defined along a coordinate axis, as shown. The distance, y, is then found by adding a quantity, x, to d1. The quantity, x, may be found using the formula shown.

Figure 4:
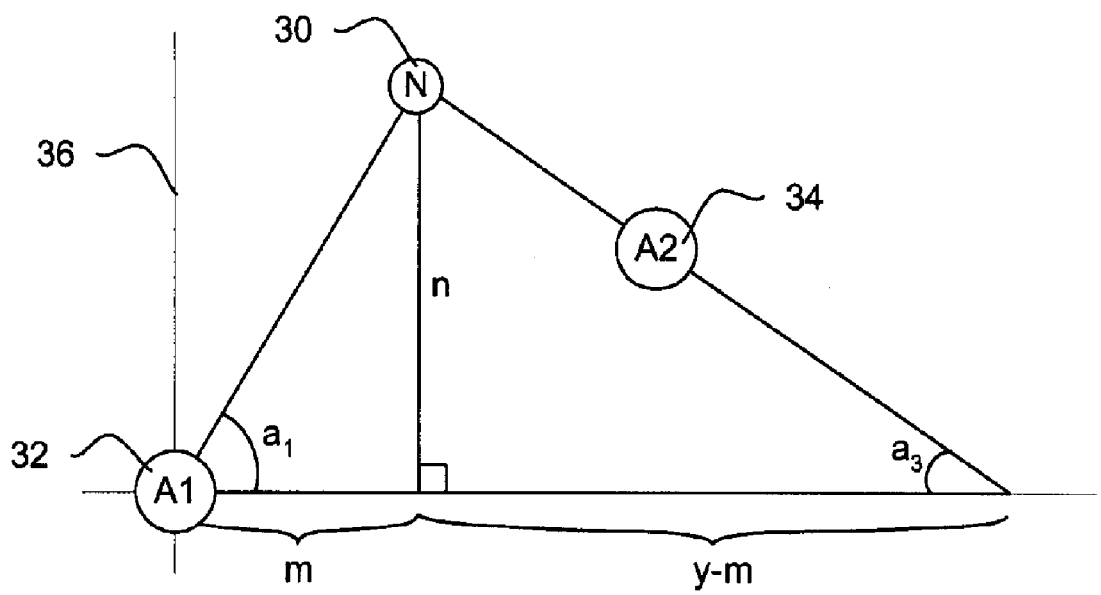
FIG. 4 shows how a node location may be determined in an illustrative example.

Turning to FIG. 4, a perpendicular from node 30 can be dropped and a distance m defined as shown. Using cotangents, distances m and n can be defined, again using the coordinate system 36, to determine the location of the node 30 in the coordinate system 36.

The example analysis of FIGS. 3 and 4 is merely illustrative of one geometric approach that can work to determine the location of node 30 with respect to the anchor nodes 32, 34. It may be understood that another anchor node may be added to the illustrative example such that localization in a three-dimensional sense can be performed as well.

In one approach, a first anchor node A1 may be at location (x1, y1), and a second anchor node A2 may be at location (x2, y2). The two anchor nodes may generate a directional signal along a 360-degree sweep, for example, such that all the distributed nodes covered in the network become aware of their angular bearing with respect to the known reference points of the two anchor nodes. For an arbitrary node at location (x, y), anchor node A1 may indicate an angle $\theta 1$ from its location at x1, y1. With respect to anchor node A1, the distributed node may infer its location as a straight line passing through (x1, y1) having a slope of $\tan(\theta 1)$. The resulting formula is:

$$y-y1=(x-x1)*\tan(\theta 1)$$

Similarly, from anchor node A2, the distributed node receives angle $\theta 2$ as well as data indicating the position of anchor node A2 at (x2, y2). Again, the distributed node may infer its location along a straight line passing through (x2, y2) having a slope of $\tan(\theta 2)$. The resulting formula is:

$$y-y2=(x-x2)*\tan(\theta 2)$$

Using these equations and solving for x gives:

$$x=(y2-y1-x2*\tan(\theta 2)+x1*\tan(\theta 1))/(\tan(\theta 1)-\tan(\theta 2))$$

The value calculated from this formula for x can then be used to determine y from either of the other formulas. Once the distributed nodes have determined their own positions, this data may be sent to a central controller, gateway node or other destination. The introduction of redundant anchor nodes may increase the robustness of the localization approach as well as introducing a higher likelihood of greater accuracy. Alternatively, the distributed nodes may communicate the received location data to a central processing node that determines the location (for example, using an arbitrary coordinate system) of each node in the network.

In further examples, localization in a third dimension may be performed. Localization in two dimensions basically uses a narrow pencil beacon with very low azimuth and elevation angle. The beacon, in two dimensions, may be equivalent to a line if the beacon width is very low. Two such beacons may be used for localization in two dimensions, with the located point being the point of intersection of the two beacons, since two lines intersect at a point. From a signal generation perspective, for example using phased-array antennae, this beacon can be generated by using a n*m grid of antenna elements where n and m are greater than 1.

Localization in three dimensions may instead use a "fan" beacon, which may be a beacon that is more or less a plane. Such a beacon may have either a very high azimuth angle and a low elevation angle, or a very high elevation angle and a very low azimuth angle. At least three such "fan" beacons may be used for three dimensional localization, with each beacon sweeping the X, Y and Z axis. The localization approach can be based on the fact that two planes intersect to form a line and a plane intersects with a line to form a point. This type of "planar" beacon may be generated by using a linear array of n*1 elements in a phased array antenna.

Figure 5A:
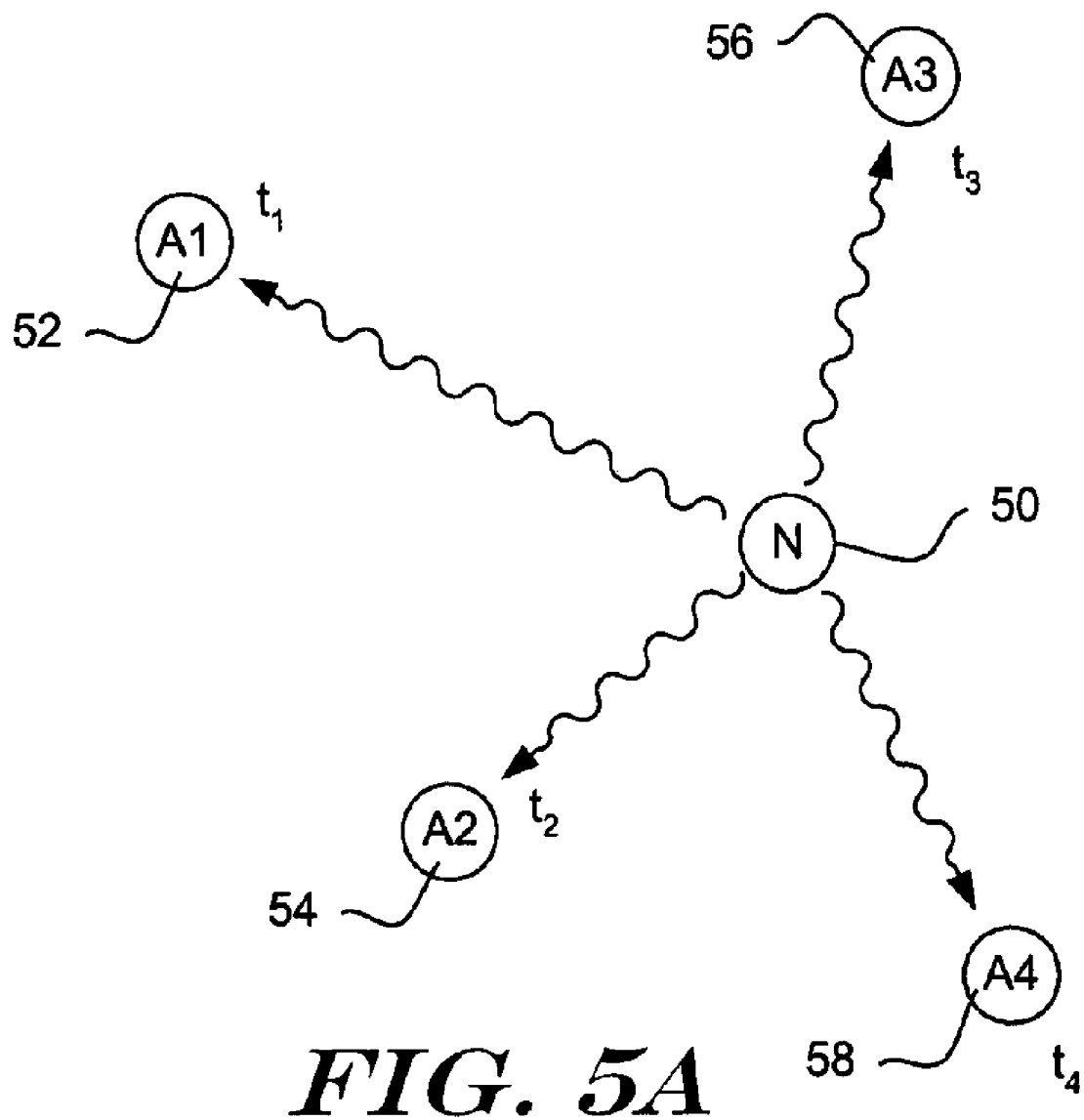
FIGS. 5A-5B illustrate node localization for another illustrative example.
Figure 5B:
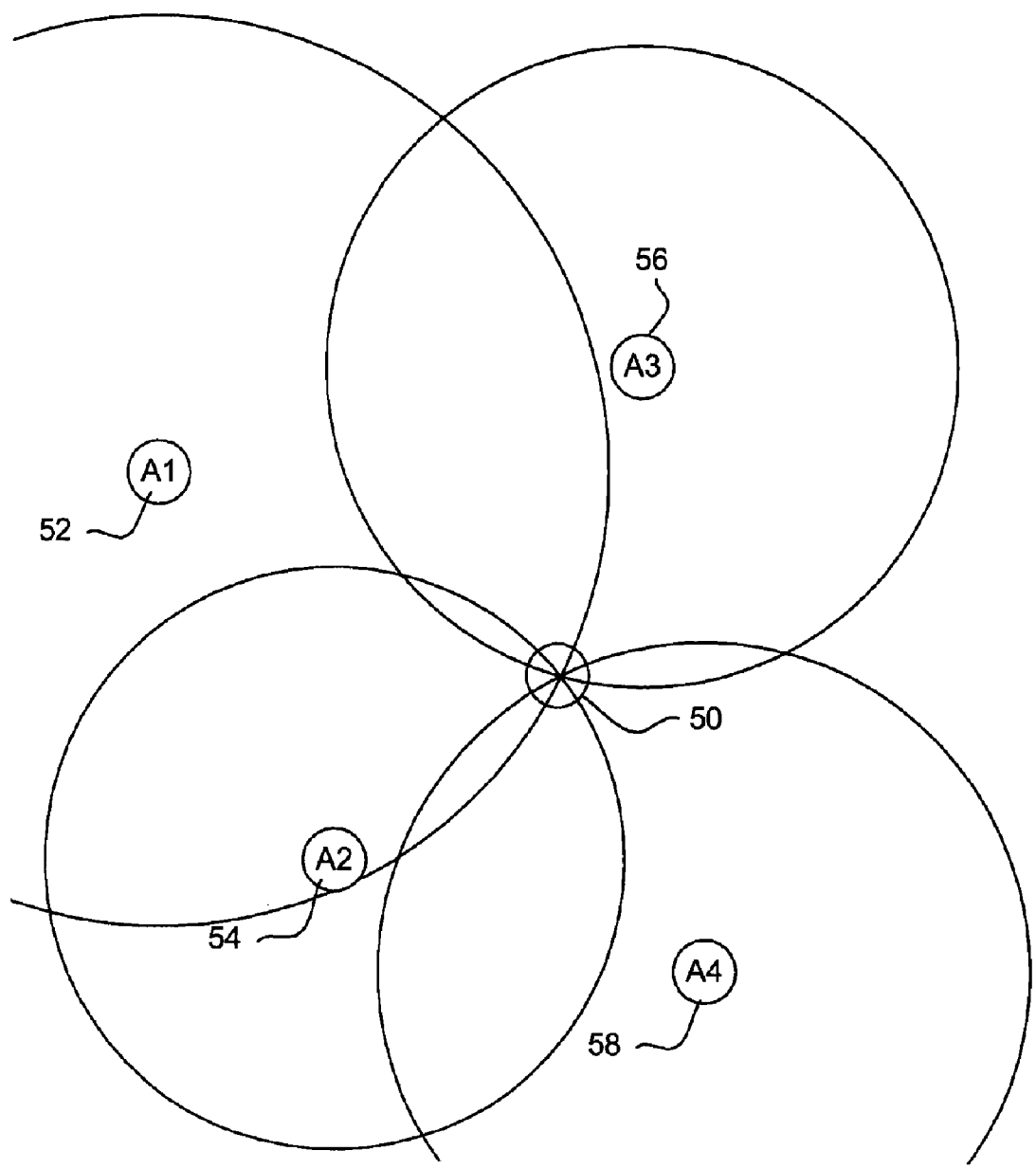

FIGS. 5A-5B illustrate node localization for another illustrative example. In this example, a single pulse or signal from node 50 will arrive at the four shown anchor nodes 52, 54, 56, 58 at four times t1, t2, t3, t4. In an illustrative example, the anchor nodes 52, 54, 56, 58 have highly accurate clocks and are closely synchronized. The relative locations of the anchor nodes 52, 54, 56, 58 are known, for instance, from the use of GPS or other location finding approaches. The anchor nodes 52, 54, 56, 58 may be placed at predetermined locations in some examples. The node 50 may have a cheaper and/or less accurate clock, but can still be accurately located in the illustrative example. Specifically, the arrival times of a pulse generated at node 50 and received by nodes 52, 54, 56, and 58, can be used to find the location of the node 50.

For instance, an iterative approach of determining the location of node 50, in two dimensions, may include setting up a number of equations and solving each using a variable. Specifically, using the variables t1, t2, t3, t4 as the arrival times, t0 as the signal transmission time, C as the speed with which the transmission travels, values for t0 may be substituted into the following formulae, and graphical or numerical analysis used to determine a likely location for the device 50:

$$d1=C(t1-t0)$$

$$d2=C(t2-t0)$$

$$d3=C(t3-t0)$$

$$d4=C(t4-t0)$$

The fourth anchor node is used since the time of sending of the message, t0, is not accurately known. If t0 was accurately known, then only three anchor nodes would be needed, however, this would entail the use of a highly synchronized clock on node 50. If node 50 is a low-cost node, a highly synchronized clock may not be provided. In some examples, node 50 may identify a time of transmission, t0', which may be only loosely or approximately synchronized, and the iterative approach may be performed by beginning with a time estimation within a possible or predefined error range for t0.

Referring to FIG. 5B, calculating the distances d1, d2, d3, d4 can yield the circles shown for each of the anchor nodes 52, 54, 56, 58. When each of the circles intersect (or when the circles come as close to intersecting as they will, depending upon the accuracy desired and the accuracy that the system clocks allow), the location found indicates the location of the node 50. While four anchor nodes 52, 54, 56, 58 are used to find the location in two dimensions in the example of FIGS. 5A-5B, a fifth anchor node may be use to resolve the location of a node 50 in a third dimension.

FIGS. 6A-6D are graphic representations of node generated signals used in some illustrative examples. In a first example, in FIG. 6A, a sinusoidal carrier is clamped from its point of peak amplitude (90 degrees) to its next zero (180 degrees). In another example, in FIG. 6B, the sinusoidal carrier is clamped to zero around its peak amplitude, creating a "notch" in the sinusoidal signal. For example, for a 2.4 GHz carrier signal, the period for the carrier is in the range of 0.4 ns, and the "notch" may be provided with a width in the range of 20 ps. Different ranges and frequencies are also contemplated within the scope of the illustrative example. In yet another example, in FIG. 6C, a notch is again created, this time by clamping the signal to its negative maximum when it would otherwise be at its positive maximum amplitude. FIG. 6D (which is horizontally expanded to better show the signal) shows superposition of a higher frequency monopulse on the sinusoidal carrier. Each of these forms of creating a dramatic, but short-lived, perturbation in the sinusoidal carrier frequency may be used to create a pulse for localization of a node. The portion of the sinusoid that is clamped or otherwise modified may vary as desired.

In another illustrative example, a portion of the carrier signal wave is modified in a manner that contradicts the manner of carrier wave modulation in use. For instance, superposition of a signal (FIG. 6D) is inconsistent with an amplitude modulation protocol. Clamping a portion of a carrier signal (FIG. 6A) is inconsistent with a frequency modulation protocol. Any such modification may be considered the provision of a pulse, including each of the formats shown in FIGS. 6A-6D.

FIG. 7 is a block diagram for an illustrative approach of sending a locator pulse. Specifically, the block diagram illustrates parts of a communication that may occur between first and second wireless devices. The communication may include a preamble 84, a message or data portion 86, and a postamble 88. The postamble 88 follows the message 86 and may include data needed for verifying accurate receipt of the message (for example, parity or frame check sequence data). The preamble 84 may include addressing data, information related to the size of the message/data 86, and various other data.

As noted in FIG. 7, in the illustrative example the pulse used in finding the location of a generating node may be located in the postamble 88. A flag may appear in the preamble 84, in the message/data 86, and/or in the postamble 88, with the flag indicating that a locator pulse is coming in the postamble. By placing the locator pulse as part of the postamble 88, circuitry for detecting the locator pulse can be selectively activated/enabled while the communication is occurring, which may improve the ability of receiving devices to detect the clamped signal from among the non-clamped portions. The pulse may be placed in the postamble while the preamble or body of the message indicates which node is sending the message and seeking to be localized.

Figure 8:
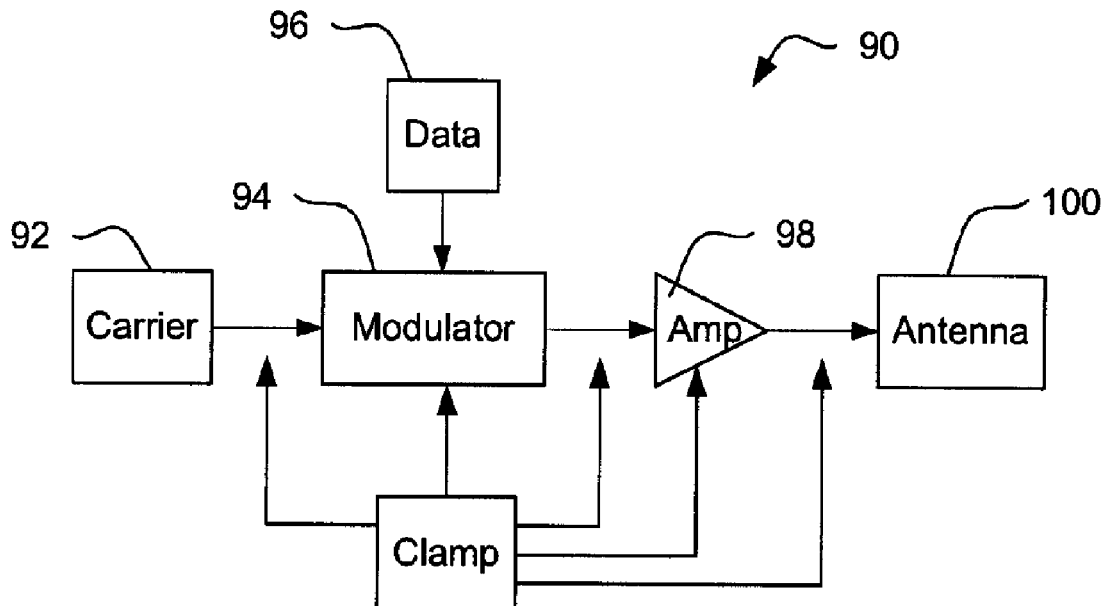
FIG. 8 is a schematic representation for an illustrative distributed node.

FIG. 8 is a partial schematic representation for an illustrative distributed node. The transmitter portion of the illustrative distributed node device is shown. The circuitry 90 includes a carrier generator 92 which may be any suitable circuit for producing a carrier signal (usually a sinusoidal signal) at or about a desired communication frequency. A modulator 94 encodes the signal from the carrier generator 92 using data signals coming from a data generator 96, again using suitable components and approaches for modulating a signal for wireless transmission. The output of the modulator 94 is then amplified using a power amplifier 98, and is distributed to the air using an antenna 100. The power amplifier 98 can take any suitable form, as well as the antenna. It should be noted that in some illustrative examples the antenna 100 need not be a directional antenna as shown above in association with other examples.

Also shown in FIG. 8 is a clamping circuit 102. The clamping circuit 102 is used to clamp a portion of the carrier signal. This may be performed, as shown, on the signal as it comes from the carrier generator 92, as a part of the modulator 94, on the signal coming out of the modulator 94, or by disabling the amplifier 98. The clamp 102 may also operate on the signal coming from the power amplifier 98 just before the signal goes to the antenna 100. In some examples, the clamp 102 comprises an analog device having a high speed switch coupled to a reference voltage or ground. For instance, the clamp 102 may include sense circuitry for sensing a portion of the carrier signal and, when enabled, the clamp 102 may operate to sense a part of the carrier signal (a peak, a highest slope point, or a zero crossing, for example) and close a switch, clamping the sensed signal for a predetermined period of time or amount of the phase of the carrier signal. Rather than clamping the sensed (carrier) signal, the clamp 102 may be replaced by a pulse circuit that provides a pulse for superposition over the carrier signal, with the pulse being of a different form/shape than would normally be part of the carrier modulation.

In another example, the clamp 102 is coupled to a first location to sense the signal before it reaches the power amplifier 98, but operates to clamp the signal coming out of the power amplifier 98. In this way, operation of the clamp 102 may sense the carrier signal and use the periodicity of the carrier signal to determine how long to clamp the signal. Since the device 90 may be adapted to operate on different channels or using varying output frequencies, such an adaptive clamp 102 may prove useful.

In yet another example, the clamp 102 is coupled to digital logic from a device controller and clamps the signal for a predetermined, yet relatively short (between a fraction of a cycle up to a few cycles of the carrier signal) period of time.

In addition to the above discussion, rather than clamping the sensed (carrier) signal, the clamp 102 may be replaced by a pulse circuit that provides a pulse for superposition over the carrier signal, with the pulse being of a different form/shape than would normally be part of the carrier modulation. In another illustrative example, multiple pulses may be applied within a time zone defined in the postamble where information about the relative time locations of the pulses is first coded within the structure of the pulses. This may provide additional opportunities for the receiving devices to detect one or more of the pulses successfully.

Figure 9:
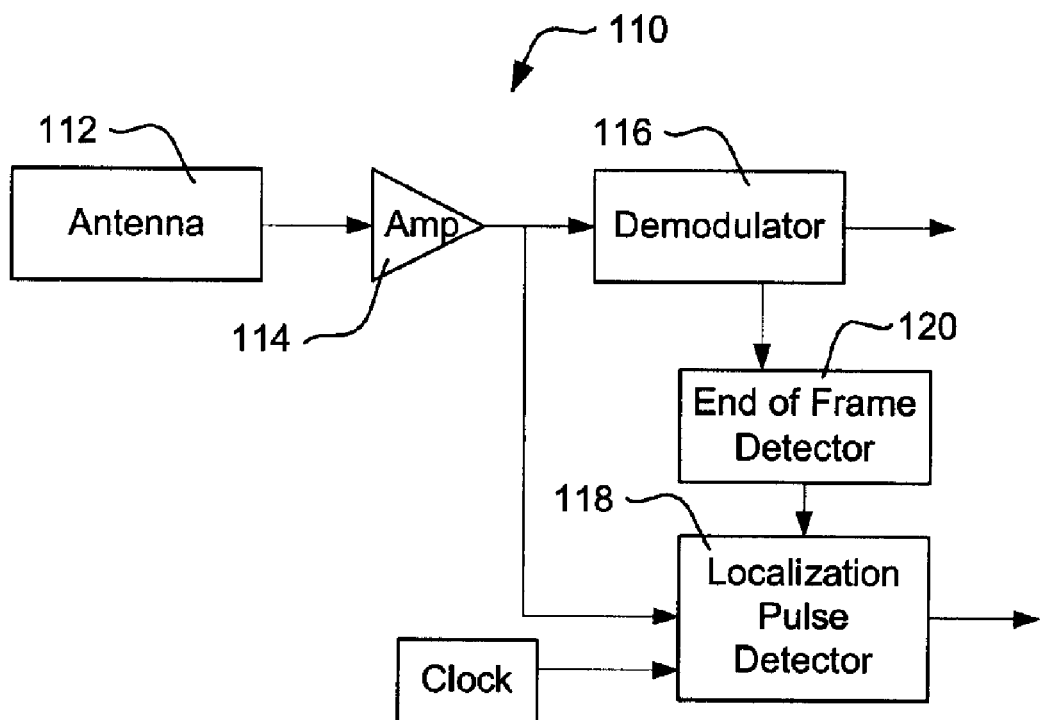
FIG. 9 is a schematic representation for an illustrative anchor node.

FIG. 9 is a partial schematic representation for an illustrative anchor node. The portion of the anchor node 110 used for receiving signals is shown. Specifically, signal is captured with an antenna 112. The signal from the antenna 112 is then amplified using a power amplifier 114, and passed to a demodulator 116 to extract data from the received signal. These portions of the circuit may take a variety of forms.

The anchor node 110 further includes a localization pulse detector 118. The localization pulse detector 118 may include circuitry adapted to observe the sinusoidal nature of received signal and identify when a localization pulse appears on the carrier or sinusoid. In some illustrative examples, the localization pulse detector 118 may include its own independent antenna or amplifier, separate from antenna 112 or amplifier 114. As shown in FIG. 6, the localization pulse 82 may be incorporated in a departure from sinusoidal signal. For example, the signal is clamped for a period of time. In some examples the localization pulse detector 118 is coupled to a system clock that is closely synchronized to system clocks for other anchor nodes. Using high speed devices in the localization pulse detector 118, the relative time of arrival for the localization pulse 82 (FIGS. 6A-6D) can then be determined.

In some examples, the circuitry further includes an end-of-frame detector 120 that determines when a data frame is about to end. The end-of-frame detector may then provide a signal to the localization pulse detector 118 identifying the time in the message where the one or more localization pulses may to be found.

Figure 10:
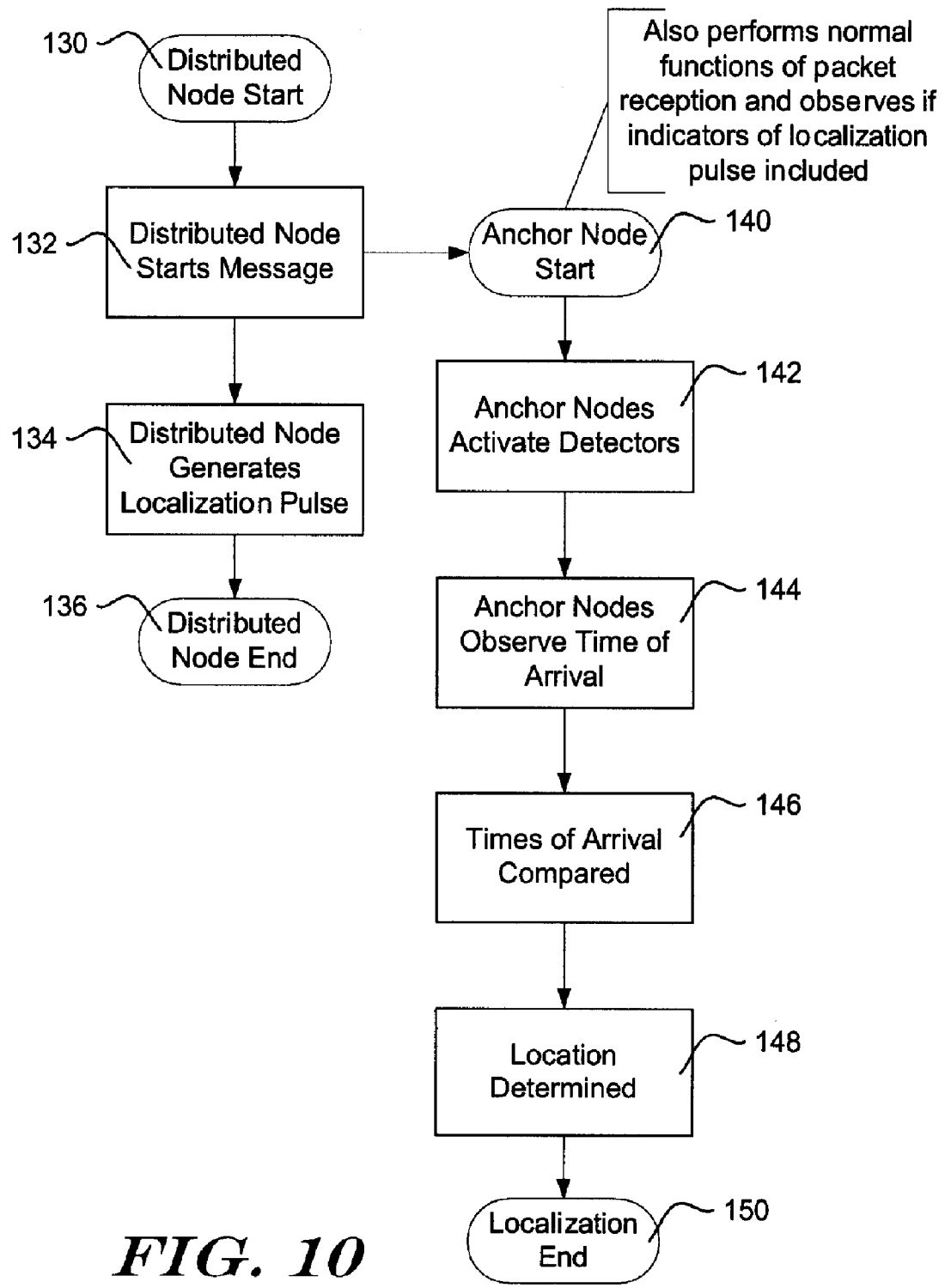
FIG. 10 is a block diagram for an illustrative approach.

FIG. 10 is a block diagram for an illustrative approach. Operations by a distributed node and an anchor node are shown separately in FIG. 10. From a start block 130, the distributed node begins generating a message (which may include the distributed nodes source address), as shown at 132. As a part of the message, for example, in the postamble of the message, the distributed node then generates a localization pulse, as shown at 134. This may end the distributed node's part in the localization process, as shown at 136, unless the distributed node performs later calculations to actually determine its location.

As indicated by the arrow, the anchor node may start its portion of the localization approach while the distributed node is generating a message, as shown at 140. The anchor node(s) may proceed with normal packet reception including observation of the source address, observing for indicators that may be in the data portion of the message (or preamble or elsewhere) specifying whether a timing pulse will be included and locating the beginning of the postamble to begin searching for the timing pulse. The anchor nodes activate respective localization pulse detectors, as shown at 142, if necessary. In some examples, the localization pulse detector circuitry may be always-on, and does not need activation. Generating a signal that identifies the beginning of the postamble and/or indicating that one or more localization pulses are coming may improve the likelihood that the one or more localization pulses will be correctly detected and their time of arrival will be accurately measured. The anchor nodes then note the time of arrival of the localization pulse, as shown at 144. Then, the times of arrival for three or more anchor nodes are compared, as shown at 146. The location of the distributed node is then determined, as shown at 148, by comparing the time of arrival to the times of arrival at other anchor nodes for packets received with the same source address. The approach ends as noted at 150.

The comparison and determination steps 146, 148 may be performed by any node having the computational capacity for such steps. For example, one of the anchor nodes may gather data related to the localization pulse times of arrival from other anchor nodes and perform the comparison and determination steps 146, 148. In another example, the distributed node receives timing information back from the anchor nodes in response to the localization pulse and performs the comparison and determination steps 146, 148.

In yet another example, the times of arrival data may be transmitted to yet another node for performing the comparison and determination steps 146, 148. For instance, a wireless network may include a particular node used for mapping out of communication routes within the system. This node may be a dedicated node, or it may perform other functions and simply include extra functionality for performing steps 146 148. In another example, the wireless system may include a gateway or base node that performs steps 146, 148, or the gateway or base node may transmit the localization information to an out-of-network device.

Figure 11:
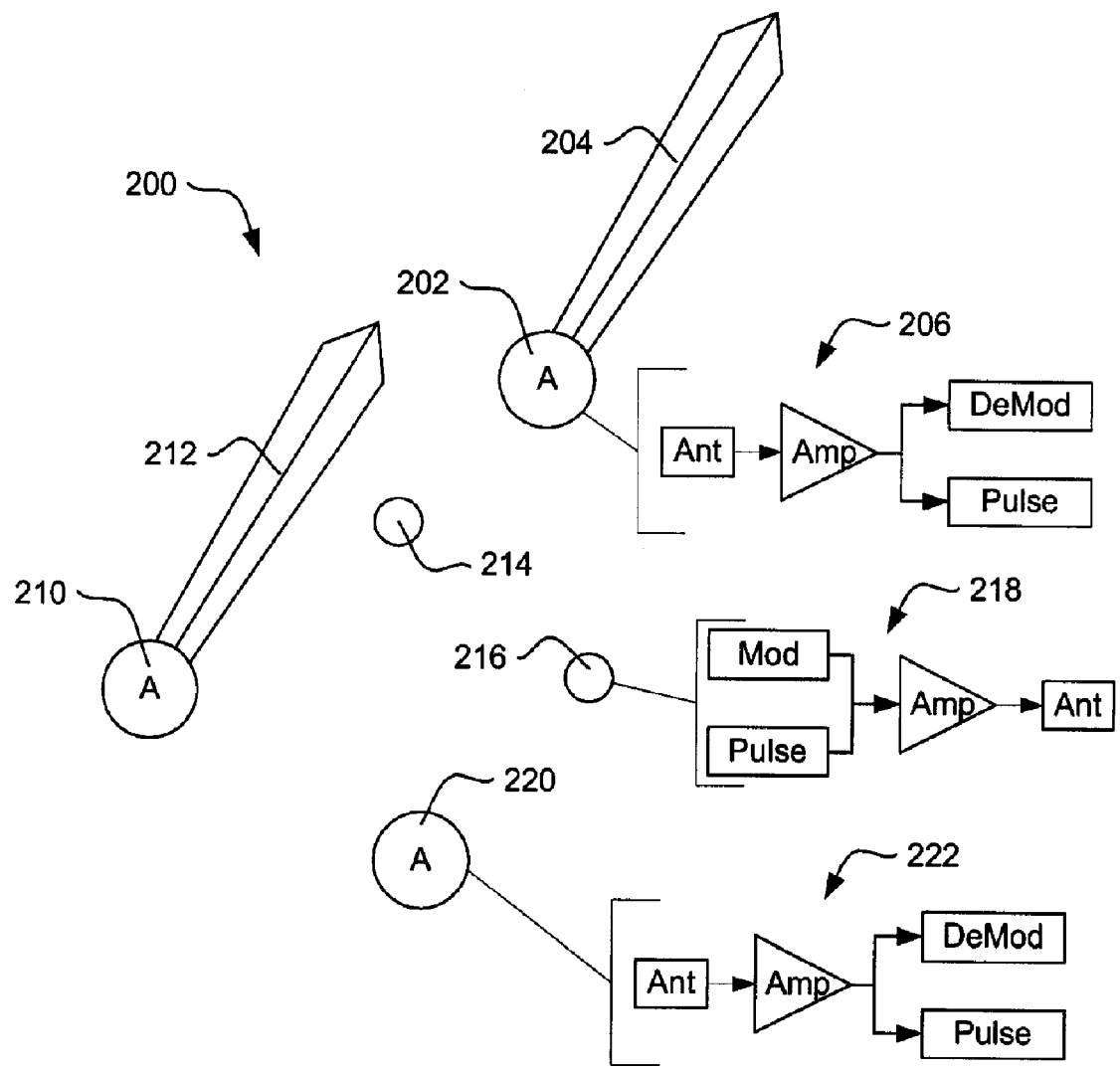
FIG. 11 illustrates a combination system.

FIG. 11 illustrates a combination system. The system creates localization redundancy and hence flexibility, as well as likely allowing for better accuracy. The system 200 may include a number of anchor nodes and a number of distributed nodes. A first anchor node 202 is shown as capable of producing a directional beacon 204 in accordance with the illustrative examples shown above in FIGS. 2, 3A-3B, and 4. The first anchor node 202 is also capable of receiving a pulse output, as shown by the circuitry at 206, for localization in accordance with the illustrative examples of FIGS. 5A-5B, and 6-10. A second anchor node 210 is shown as including apparatus capable of providing a directional beacon 210, but may or may not include the pulse detection circuitry. A first distributed node 214 is illustrated as a basic node having directional beacon reception capabilities, and may or may not include pulse generation circuitry. A second distributed node 216 includes pulse generation circuitry as shown at 218, but need not be capable of receiving messages. A third anchor node 220 includes the pulse detection circuitry, as shown at 222, but may or may not include directional signal capabilities.

As can be seen in FIG. 11, there are various combinations available. In some examples, a "dummy" distributed node can generate a localization pulse as part of a message it generates according, for example, to a schedule, though the dummy distributed node may lack message reception circuitry/capability. The system may also include an anchor node with the task of keeping other anchor nodes in accurate time synchronization. Use of anchor nodes such as anchor node 202, having both directional output 204 and pulse detection circuitry 206 may allow flexibility in the kind of distributed nodes 214, 216 that are compatible with the system. Alternatively, use of distributed nodes having both reception and pulse generation circuitry 218 allows different anchor nodes to be used as well.

In another use of the combination, a single node 216 may be localized using both a pulsed time of arrival approach as well as a directional approach such that two anchor nodes having the capabilities of node 202 may estimate a position of a single node 216 in three dimensions. For example, defining a coordinate system having an axis passing from a first anchor node to a second anchor node, the directional approaches herein can use two anchor nodes to find a line on which a distributed node must lie. If the anchor nodes produce directional outputs having central lobes that may be characterized as generally planar in three dimensions, the line on which the distributed node must lie is the intersections of the planar outputs. The intersection(s) of this line with the shape of possible locations for the distributed node that can be determined, in three dimensions, using the pulse approach, will provide a limited number of possible locations for the distributed node.

In yet another use combination, the directional antenna in anchor node 202 may be used as a receiving antenna, rather than sending, with element 204 indicating a swath of greater antenna sensitivity. Signals generated within the antenna focus area 204 will be received at higher amplitude, while signals generated elsewhere may not be sensed. In some instances, the anchor node 202 may have plural antennae, with one antenna used to receive a localization pulse, while the directional antenna is used during data transfer from a node to be located, such as node 216, to observe the direction that the localization pulse is coming from. In this manner, a direction and range for the device 216, with respect to device 202, may be determined by device 202, itself. This information may be used to reduce the number of anchor nodes needed for localizing a given node.

In yet additional illustrative examples, a combination of pulsed and directional beacon localization may enable anchor nodes to observe clock characteristics of a node being localized. For example, if a distributed node generates a pulse signal and indicates the time of transmission relative to a synchronization time, the anchor nodes may use the pulse signal and/or directional beacon-based localization data to determine, according to the highly synchronized anchor node clocks, when the distributed node generated the pulse signal. The calculated time of transmission may be compared to the time indicated by the distributed node to observe the accuracy of the distributed node clock. Such data may in turn be used to trouble-shoot a system in which a communications schedule is used to move data.

In a combination example, the directional antenna of certain anchor nodes enables distributed nodes to identify their own location from the directional data packets transmitted by the anchor nodes, but without any specific bi-directional communication with the particular anchor nodes. Analogously, pulse-based approaches allow the anchor nodes to identify the location of distributed nodes without any further specific communication with them. The combination example allows location identification throughout a system without specific bi-directional communication between at least some of the pairs of devices that would, in some older approaches, need to establish bi-directional communication.

It should be noted that one of the physical limitations to the directional beacon approaches is that, as the directional beacon propagates, it tends to spread, making localization at greater distances less likely to be highly accurate for the directional beacon approach. Within an environment in which clusters occur or where several networks are distributed from one another, pulse approaches may be used to observe positions of devices in other clusters or networks, while directional approaches may be used to observe locations within a local network or cluster of devices. With this in mind, another illustrative example performs a first estimate of location using one of the directional or pulse approaches, and subsequently determines which approach is better suited to providing a best estimate of location.

In yet another example, a system of existing anchor nodes is used to initialize a new anchor node by the use of one or both of the directional and pulse-based approaches of determining node location. In such an example, the new anchor node is adapted to perform the functions of a distributed node for at least one of the directional and/or pulse-based approaches of determining node location. In one such example, localization may be performed using a directional approach for the new anchor node in order to provide verification of node locations for several anchor nodes in the system including the new anchor node. For example, if the new node has a location that is determined by the use of a time of arrival approach, a directional approach may be used to verify the new node location as well as determining whether there may be inaccuracies in the position information related to other anchor nodes.

Another illustrative example includes a system for localization in a wireless sensor network having a plurality of wireless nodes adapted to transceive wireless signals. The illustrative network comprises a plurality of anchor nodes adapted to be configured with reference positional information, the anchor nodes having at least one directional antenna to broadcast positional information through at least one unidirectional wireless signal path, and a plurality of sensor nodes equipped with wireless transceivers for communication, the sensor nodes including a processor configured to capture directional and location information from at least two anchor nodes for determining the location of the sensor nodes. The system may further comprise a central processor for receiving data related to captured directional and location information from the sensor nodes and determine the location of the sensor nodes. In another example, the sensor nodes may be adapted to determine their position with reference to the anchor nodes from captured directional and location information.

In some examples of the pulse-based approaches, the one or more pulses may be proved at locations other than the postamble. While an advantage of the postamble use is that the message will have already undergone a FCS (frame check sequence) and the receiving devices will already be aware that the message is a good message, this does not necessarily limit the present invention to providing the pulse at that location. There are other suitable locations in a message that may also be used. Some examples include, for example, the end of the preamble, just after the start of the frame delimiter, or elsewhere. The pulse may be provided at a location generally within a data portion of the message as well. In some instances, the pulse is provided at a location in the message where the carrier has a constant format. For example, the receiving device demodulator may, prior to and during pulse delivery, see a series of zeroes or ones, rather than a changing signal. This may also be one form of providing an indication that the localization is about to be received, as in, the demodulator may output "n" series of zeroes or ones, with the localization pulse appearing in one or more of the series. One may indicate when the appropriate series of demodulator outputs will begin. There may be a number of ways to provide such indicators, as well as a plurality of locations within a message that are suitable for providing a localization pulse.

Yet another combination example is one in which the pulse localization instances for anchor nodes and/or distributed nodes are included in a system which also includes an anchor node having directional signal capture. The system may include an anchor node that includes a directional antenna capable of preferential signal capture along a first direction. In such an example, the directional anchor node is adapted to cause the directional antenna to change the direction of the preferential signal capture, the second anchor node being adapted to determine a direction from which a received signal is generated. For this example, the source location for the pulsed output may also be determined with reference to the directional antenna reception. This data may be combined, again, with data from the pulsed output instances to further improve system accuracy, reliability, or flexibility.

In the present specification, some or the matter may be of a hypothetical or prophetic nature although stated in another manner or tense.

Further, although the invention has been described with respect to a least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method of determining the location of a wireless device, the method comprising:
    generating a first beacon from a first anchor node having a known location, the first beacon including a series of data packets, at least a first packet of the first beacon including an indication of the source and the direction of the first beacon at the time the first data packet is generated;
    generating a second beacon from a second anchor node having a known location, the second beacon including a series of data packets, at least a second packet of the second beacon including an indication of the source and the direction of the second beacon at the time the second data packet is generated;
    capturing the first data packet and the second data packet with the wireless device; and
    estimating the position of the wireless device with respect to the first and second anchor nodes;
    wherein the first and second beacons are spatially narrow beacons; and
    wherein the step of capturing the first data packet and the second data packet includes the following:
        capturing a third data packet also generated by the first anchor node and including an indication of the source and direction of first beacon at the time the third data packet is generated;
        observing the signal strength of the first beacon at the time of receipt of the first data packet and the third data packet; and
        selecting the first data packet or the third data packet for use in the estimating step.

2. The method of claim 1 wherein at least one of the first beacon and the second beacon is generated as the main lobe of an output from a phased array antenna.

3. The method of claim 1 wherein the wireless device performs the estimating step.

4. The method of claim 1 wherein the wireless device transmits data related to the first data packet and the second data packet to another node and the another node performs the estimating step.

5. The method of claim 1 further comprising:
    generating a third beacon from a third anchor node having a known location, the third beacon being a spatially narrow beacon and including a series of data packets, at least a third packet of the third beacon including an indication of the direction of the third beacon at the time the third data packet is generated;
    wherein the estimating step further includes estimating the position of the wireless device with respect to the third anchor node.

6. The method of claim 5 wherein the estimating step includes using data from the third beacon to check or improve the accuracy of estimation performed using data from the first and second beacons.

7. The method of claim 5 wherein the estimating step includes estimating the location of the wireless device in three dimensions.

8. A wireless device including components configure to perform wireless communication, wherein the wireless device is configured to perform localization steps by the following steps:
    receiving a first beacon from a first anchor node, the first beacon including data packets generated as part of the first beacon, at least some of the data packets indicating the source of the data packets and the direction of the first beacon at the time they are generated;
    identifying a first data packet indicative of the direction of the first beacon at the time the first beacon is directed at the wireless device;
    receiving a second beacon from a second anchor node, the second beacon including data packets generated as part of the second beacon, at least some of the data packets indicating the source of the data packets and the direction of the second beacon at the time they are generated; and
    identifying a second data packet indicative of the direction of the second beacon at the time the second beacon is directed at the wireless device;
    wherein the step of identifying the first data packet includes:
    receiving the multiple data packets at different times, the multiple data packets indicating different directions of the first beacon;
    comparing received signal strengths for the first beacon at times corresponding to receipt of the multiple data packets; and
    selecting one of the multiple data packets that corresponds to higher received signal strength than others of the multiple data packets to be the first data packet.

9. The wireless device of claim 8 wherein the localization steps further include estimating the position of the wireless device with reference to the first and second anchor nodes by the use of the first and second data packets.

10. The wireless device of claim 8 wherein the localization steps further include generating localization data including data related to the first and second data packets and sending the localization data to a localization node that performs steps for estimating the position of the wireless device.

11. A system configure to communicate wirelessly, the system comprising a number of anchor nodes having known locations and at least one distributed node, the system configured to determine the location of a first distributed node by the following steps:
    at least first and second anchor nodes generate first and second beacons, the first and second beacons being formed as directional beacons by the use of directional antennae, the first and second beacons being generated such that each is directed in a number of angles relative to the first and second anchor nodes, and the first and second beacons including data packets indicating the direction of the first and second beacons at the time of generation of the respective data packets;
    the first distributed node captures a first data packet from the first beacon indicative of the location of the first distributed node with reference to the first anchor node when the first beacon is directed toward the first distributed node; and
    the first distributed node captures a second data packet from the second beacon indicative of the location of the first distributed node with reference to the second anchor node when the second beacon is directed toward the second distributed node;

wherein the first distributed node captures the first data packet by receiving at least two data packets at different times that indicate distinct angles of the first beacon from the first anchor node, observing which of the at least two data packets has a greatest signal strength, and identifying the data packet having the greatest signal strength as the first data packet.

12. The system of claim 11 wherein at least one of the first and second beacons is generated by the use of a phased array antenna.

13. The system of claim 11 wherein the first distributed node determines its location with respect to the first and second anchor nodes.

14. The system of claim 11 wherein the first distributed node generates one or more messages indicating data related to the first and second data packets for sending to a localization node that determines the location of the first distributed node.

15. The system of claim 11 wherein:
a third anchor node generates a third beacon, the third beacon being formed as a directional beacon by the use of a directional antenna, the third beacon being directed in a number of angles relative the third anchor node, and the third beacon including data packets indicating the direction of the third beacon at the time of generation of the data packet; and
the first distributed node captures a third packet from the third beacon indicative of the location of the first distributed node with reference to the third anchor node when the third beacon is directed toward the first distributed node.

16. The system of claim 11 further comprising a new anchor node, wherein the new anchor node has a location that is determined by the use of a first approach of determining location, and the new anchor node verifies its own location by capturing at least first and second directional beams from other anchor nodes.

17. A system configure to communicate wirelessly, the system comprising a number of anchor nodes having known locations and at least one distributed node, the system configured to determine the location of a first distributed node by the following steps:
at least first and second anchor nodes generate first and second beacons, the first and second beacons being formed as directional beacons by the use of directional antennae, the first and second beacons being generated such that each is directed in a number of angles relative to the first and second anchor nodes, and the first and second beacons including data packets indicating the direction of the first and second beacons at the time of generation of the respective data packets;
the first distributed node captures a first data packet from the first beacon indicative of the location of the first distributed node with reference to the first anchor node when the first beacon is directed toward the first distributed node; and
the first distributed node captures a second data packet from the second beacon indicative of the location of the first distributed node with reference to the second anchor node when the second beacon is directed toward the second distributed node;
wherein at least one distributed node is configured to generate a pulsed output in a data message, the pulsed output useful for localization by a time of arrival approach, and at least one anchor node is configured to receive a pulsed output from a distributed node and identify a time of arrival of the pulsed output.

18. The system of claim 17 wherein the system is also configured to perform localization using a combination of directional data captured by the distributed node and time of arrival data captured by at least first and second ones of the at least one anchor node configure to receive a pulsed output.

19. The system of claim 17 wherein a first estimation of location is made using at least one of:
a directional data approach using directional data captured by a distributed node from one or more anchor nodes having directional antennae; or
a time of arrival approach using timing data captured by anchor nodes configure to receive a pulse generated by a distributed node;
and, using the estimation of location, one of the directional data approach or the time of arrival approach is selected to provide a best estimate of location.

20. A system for localization in a wireless sensor network having a plurality of wireless nodes configure to transceive wireless signals, the network comprising:
a plurality of anchor nodes configure to be configured with reference positional information, the anchor nodes having at least one directional antenna to broadcast positional information through at least one unidirectional wireless signal path;
a plurality of distributed nodes equipped with wireless transceivers for communication, the distributed nodes including a processor configured to capture directional and location information from at least two anchor nodes for determining the location of the distributed nodes, wherein at least one anchor node is configured to use a directional-output based localization approach in which a directional antenna is used to produce a directional output for use in determining the location of one or more anchor or distributed nodes; at least one anchor node is configured to identify a pulsed output from another node for use in a time-difference of arrival localization approach; and at least one node within the system is configured to determine, for a given node to be localized, which of the time-difference of arrival or directional-output localization approach is likely to be more accurate.

21. The system of claim 20 further comprising a central processor for receiving data related to captured directional and location information from the distributed nodes and determine the location of the distributed nodes.

22. The system of claim 20 wherein the distributed nodes are configured to determine their position with reference to the anchor nodes from captured directional and location information.

23. The system of claim 20 wherein the plurality of anchor nodes are configured to utilize a localization mode in which a directional output from the directional antenna is generated, the directional output including data packets including localization data indicating a direction of the directional output relative to a reference direction at the time of their transmission, and the distributed nodes are configured to capture a plurality of data packets including the localization data, identify a data packet corresponding to a highest signal strength, and thereby identify the direction of the distributed node relative to a directional-output-generating anchor node.

* * * * *